UNITED STATES PATENT OFFICE.

WILHELM HERZBERG, OF BERLIN, GERMANY, ASSIGNOR TO THE ACTIEN-GESELLSCHAFT FÜR ANILIN FABRIKATION, OF SAME PLACE.

AMIDOTRIAZIN.

SPECIFICATION forming part of Letters Patent No. 536,524, dated March 26, 1895.

Application filed October 29, 1894. Serial No. 527,336. (Specimens.) Patented in Germany October 15, 1893, No. 76,491, and January 19, 1894, No. 78,006, and in France December 4, 1893, No. 234,521.

*To all whom it may concern:*

Be it known that I, WILHELM HERZBERG, of Berlin, in the Kingdom of Prussia, German Empire, have invented new and useful Improvements in the Production of Amidotriazins; and I do hereby declare that the following is a full, clear, and exact description of the invention, which will enable others skilled in the art to which it appertains to make and use the same, and for which patents have been obtained as follows: in France, No. 234,521, dated December 4, 1893, and certificate of addition February 22, 1894, and in Germany, No. 76,491, dated October 15, 1893, and No. 78,006, dated January 19, 1894.

M. Goldschmidt (*Ber. D. Chem. Ges.*, XXIV, p. 1001) described a new class of compounds, which are formed by the action of aldehydes on the orthoamidoazo bodies. As contrasted with the products obtained by the reaction of aldehydes on amido-bodies, the compounds above mentioned are very stable.

I have discovered that a new series of substances which shall be denominated "amidotriazins" may be formed by reacting with aldehydes upon the diamidoazo bodies, generally known under the designation: chrysoidins; that is to say, the coloring-matters formed by the action of diazotised amins or tetrazotised diamins, or their sulfo- or carbo-acids on the meta-diamins. The said chrysoidins react very easily with aldehydes of the fat and aromatic series. The products thus obtained are very stable. They are not decomposed even when heated under pressure with mineral acids to 170° or 180° centigrade. Owing to the presence of amido groups these products may be diazotised and combined with phenols, amins, the sulfo- and carbo-acids of phenols and amins to form azo-coloring-matters.

The substances which are prepared by means of chrysoidins containing no sulfo- or carboxyl-group are strong bases, the constitution of which may for instance be expressed by the following typical formula:

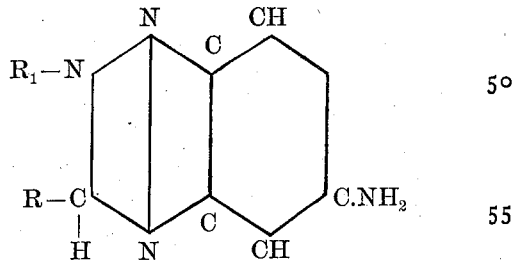

the group R—C signifying an aldehyde radical, the group R₁ signifying a radical of the benzene or naphtalene series.

By the action of sulfonating agents the condensation-products obtained from aldehydes and chrysoidins may be sulfonated; according to the conditions, that is to say according to the quantity of the fuming sulfuric acid and the temperature used, mono or disulfo-acids of the above mentioned base may be prepared. These sulfonation-products can equally be employed with great advantage for the production of azo-dyes. Some of the above mentioned sulfo-acids or their salts are moreover distinguished by their very sweet taste.

The following example may serve to illustrate in what manner the process may be carried out. Twenty-five kilos chrysoidin (diamido-azo-benzene-chlorid) and eleven kilos benzaldehyde are dissolved in eleven kilos concentrated hydrochloric acid and fifty kilos common acetic acid. The mixture is heated on the water-bath for about six hours until the coloring-matter disappears. Then the solution is poured into one thousand liters of water, filtered and the base is precipitated by addition of carbonate of soda. For purifying the precipitate may be dissolved by boiling with dilate sulfuric acid. The sulfate crystallizes from the cold solution in the form of white needles. The base obtained from this sulfate is colorless, insoluble in water, but easily soluble in hot alcohol and benzene. By the action of nitrite it yields a diazo compound that is very stable and only sparingly soluble in water.

The constitution is represented by the following formula:

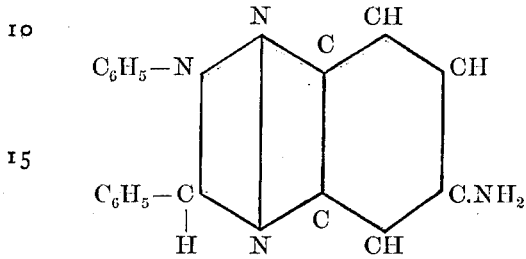

Second. In order to transform the aforedescribed base into a monosulfo acid one part of the same—or of a salt thereof—is dissolved in three to six parts of fuming sulfuric acid (twenty parts anhydride) and the mixture is gently heated for some time. The reaction product is poured into cold water whereby the monosulfo acid formed separates in the shape of crystalline white flakes. The monosulfo acid is sparingly soluble in water, but its alkali salts are easily soluble. Treated with nitrous acid the monosulfo acid yields a moderately soluble diazo compound.

Third. By treating the amidotriazin described under 1 with fuming sulfuric acid at higher temperature on the water bath for several hours a disulfo acid is formed, which is easily soluble in water and may be isolated in the well known manner in the form of its lime or soda-salt.

By starting instead of from diamidoazobenzene from other members of the chrysoidin-group referred to in the beginning of the specification, or by replacing the benzaldehyde by its substitution products or other aldehydes of the aromatic or fat series analogous amidotriazin-derivatives may be obtained.

What I claim as my invention, and desire to secure by Letters Patent, is—

1. The herein described process for the production of a new series of substances, which may be termed "amidotriazins," that is to say substances produced by the action of aldehydes of the aromatic or fat series upon chrysoidins (meaning thereby the coloring matters formed by the action of diazotised amins or tetrazotised paradiamins or their sulfo or carbo acids on the metadiamins), and the sulfo derivatives of those of the said substances which contain no sulfo or carbonyl groups, produced by the action of sulfonating agents on those.

2. As new products the "amidotriazins" which are sulfo acids of substances having the following constitution-formula:

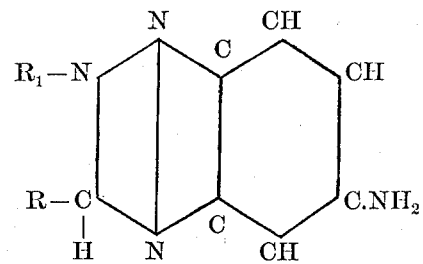

forming in dry state a white crystalline powder, more or less soluble in water, insoluble in alcohol, soluble in alkaline liquors, possessing a strong sweet taste.

In testimony whereof I hereunto set my hand and affix my seal, in the presence of two witnesses, this 10th day of October, A. D. 1894.

WILHELM HERZBERG. [L. S.]

Witnesses:
RUDOLF VON ROTZENBURG,
GUSTAV LUCHT.